United States Patent Office 2,723,904
Patented Nov. 15, 1955

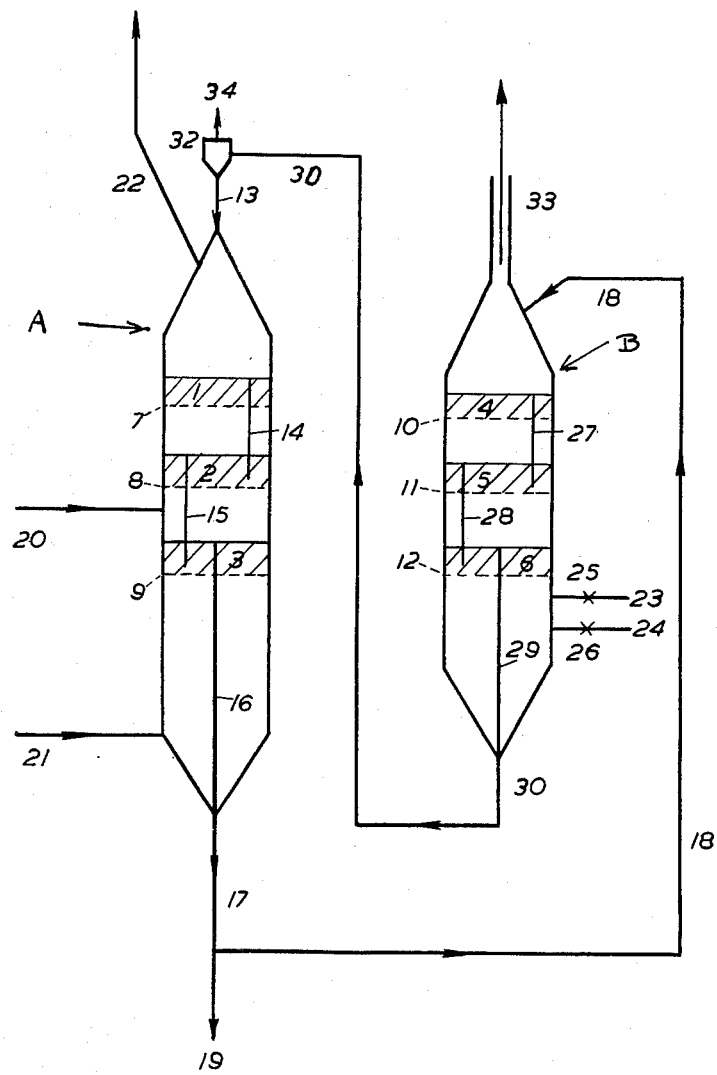

2,723,904

PROCESS AND APPARATUS FOR THE HYDROLYSIS OF FERRIC CHLORIDE

Lewis Reeve, Sheffield, England, assignor to The United Steel Companies Limited, Sheffield, England Application November 30, 1951, Serial No. 259,030

Claims priority, application Great Britain December 4, 1950

6 Claims. (Cl. 23—200)

This invention relates broadly to the hydrolysis of ferric chloride to ferric oxide and more specifically to processes in which iron ore is concentrated by reactions involving such hydrolysis.

As is described in application Serial No. 174,492, iron ore containing ferric oxide can be treated with hydrochloric acid gas to produce ferric chloride, and the ferric chloride can then be separated from the ore by volatilisation and treated at a higher temperature with a small excess of steam to produce ferric oxide and hydrochloric acid gas. This second or hydrolysis reaction proceeds according to the equation:

$$2FeCl_3 + 3H_2O \rightarrow Fe_2O_3 + 6HCl$$

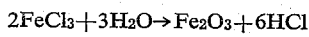

In the plant also described in application Serial No. 174,492 for carrying out this process, the ferric chloride is introduced into a brick-lined vessel containing vertical refractory or metal tubes heated to temperatures between 400 and 800° C. by the hot gases from a combustion chamber. Steam, which is superheated to about the reaction temperature, is injected into the chamber, and the hydrolysis to yield ferric oxide and hydrochloric acid gas takes place in the tubes. The ferric oxide produced is deposited on the walls of the tubes or on baffle plates suspended in these tubes in a loose flocculent form.

An object of this invention is to carry out the hydrolysis in an improved way.

Another object of this invention is to precipitate the ferric oxide produced by hydrolysis on a material by which it is carried out of the hydrolysing reaction vessel.

A further object of the invention is to precipitate ferric oxide on pieces or particles of ferric oxide.

Yet another object of the invention is to provide an improved ore-concentration process and plant.

In this invention the reaction by which ferric chloride is hydrolysed to ferric oxide is carried out on the surface of hot particles or small pieces or lumps of a refractory material, which is preferably ferric oxide either in a substantially pure form or as a naturally occurring ore. The refractory material may, however, also be some other metallic oxide, e. g. another iron oxide or manganese oxide, which may likewise be substantially pure or a naturally occurring ore; or silica or alumina or a material containing these, either uncombined or combined, e. g. sand, broken fire-brick, kaolin or talc; or a metal such as steel. In any event the refractory material must be capable of withstanding the temperatures involved without softening or decomposing, and if it forms chlorides, these must be at least as easily hydrolysed as ferric chloride. Moreover, under the hydrolysing conditions it must not be attacked by hydrochloric acid gas or steam.

In carrying out the invention, the refractory material is preferably continuously circulated through the reaction vessel and a fraction is bled from the material discharged from the reaction vessel and constitutes the final product, which will consist of the refractory material coated with deposited ferric oxide. The remaining material is reheated and returned to the reaction vessel.

When, as is preferred, ferric oxide is used as the refractory material, the solid end product of the hydrolysis reaction is substantially pure ferric oxide. When the refractory material is not ferric oxide, the percentage of ferric oxide in the end product steadily increases as the process continues, and, if desired, fresh refractory material may be supplied continuously or intermittently so as to maintain any desired ratio of refractory material to ferric oxide in the end product.

The particles of refractory material tend to increase in size steadily as ferric oxide is deposited upon them. This growth may be allowed to continue, or, if preferred, finely divided refractory material may be introduced continuously or intermittently to maintain a constant average size of discharge product. To some extent this introduction of fine refractory material occurs naturally as a result of some breakage or abrasion of the growing particles, and this tends to limit the growth.

The hydrolysis reaction is endothermic and the heat required to maintain it is preferably supplied by heating the circulating refractory material. If the whole process is carried on in a large works where iron ore is smelted, the heating may be effected very economically by means of blast furnace or coke oven gas. The circulating refractory material therefore acts as a medium for introducing the necessary amount of heat lost during the hydrolysis reaction, and also as a catalytic surface upon which further hydrolysis of ferric chloride to produce fresh ferric oxide occurs.

The refractory material may be in lump form of any size from, say, ¼" in diameter upwards, and may be either spherical or angular in form. Preferably, however, it is finely divided, being, say 1/10 inch downwards in size, and is formed into one or more fluidised beds in which the hydrolysis reaction takes place, the bed or beds being kept in the required turbulent state by the gases introduced into the vessel. These gases will generally consist not only of ferric chloride and steam, but also of excess hydrochloric acid gas from the chloridising stage. Finely divided refractory material must be fluidised because the growth of the particles due to the deposited ferric oxide would otherwise result in complete locking of the particles into a compact solid mass, which would choke the reaction vessel. As long as the particles of refractory material are in a turbulent state, they will continue to remain free and separate despite the deposition of ferric oxide upon them, whereas if they are stagnant they will quickly lock together.

The tendency of the particles to lock together is less marked when lumps are used. Nevertheless, some locking tends to take place at points of contact of the pieces of the refractory material, and, to prevent this, there should be some relative motion of the lumps. For instance, the lumps may be fed slowly down a vertical shaft furnace, as a result of which the points of contact of the particles are constantly changed. Alternatively, a rotary hearth furnace of the Herreshof type may be used in which rotating arms keep the particles in slow relative motion and so prevent locking. In general, completely stagnant beds of refractory material should be avoided.

The invention will be more clearly understood by reference to the annexed drawing, which shows diagrammatically the hydrolysing section of a plant for concentrating iron ore according to the invention.

In this drawing the hydrolysing reaction vessel is shown at A. It is made of brick-lined mild steel plate and contains three perforated diaphragms 7, 8 and 9. The refractory material, assumed to be ferric oxide, enters at a temperature between 600 and 900° C., preferably about 700° C., through a pipe 13 and flows downwards through the vessel, forming fluidised beds 1, 2 and 3 on the three diaphragms and overflowing from the beds through standpipes 14, 15 and 16. The pipe 16 leads to a discharge pipe 17.

The apparatus shown is designed as part of a complete plant in which iron is concentrated as described in application Serial No. 174,492. The reacting gases are introduced at two points, the ferric chloride together with some steam and circulating hydrochloric acid gas from the vessel in which the ferric chloride is formed entering at 20 above the bottom bed 3 at a temperature between 200 and 400° C., and steam with some hydrochloric acid gas entering at 21 below the bottom bed 3 at a temperature of about 200° C. Enough gas enters at the points 20 and 21 to maintain the beds 1, 2 and 3 fluidised. The diameters of the beds should be such that, having regard to the available volume of gas flowing in the remainder of the plant, the linear gas velocity is in the range of 0.2 to 3 feet per second calculated for empty beds at room temperature, the exact velocity range depending upon the size of the fluidised particles. Hydrolysis of the ferric chloride vapour to ferric oxide takes place on the surface of the fluidised particles of the beds 1, 2 and 3. Hydrochloric acid gas and steam leave the top of the vessel through a pipe 22 and are led to a condenser.

The fact that the gases entering at 21, i. e. nearer the point of discharge of the refractory material, are richer in steam than those entering at 20 ensures that any unchanged ferric chloride which may be deposited on the descending material and carried downwards is converted to ferric oxide by the excess steam in the last bed and is not discharged as the chloride. A further reason for introducing the gases in this way is that the steam or steam-rich gas available for introduction at 21 will be at a lower temperature than the mixture of ferric chloride and hydrochloric acid gas introduced at 20 and will be preheated by heat exchange with the hot descending solids, cooling the latter somewhat before discharge.

As the heat lost in the reaction is supplied by the heated refractory material, the reacting gases supplied to the reaction vessel need not be superheated to a high temperature, but may be introduced into the reaction vessel at a temperature between 200 and 400° C. as indicated above. The temperature in the hydrolysing reaction vessel should not drop below 400° C., since if it does the reaction may reverse and ferric chloride will be formed from the ferric oxide. The reacting gases come from a chloridising vessel, and to prevent them continuing their chloridising action the temperature must be raised and hydrolysis of the ferric chloride promoted. The material discharged through the pipe 17 is preferably at a temperature of about 450° C.

Some of the material is bled off through a pipe 19 as a final product, i. e. as pure $Fe_2O_3$ or, if another refractory material is used, as $Fe_2O_3$ deposited upon that material. The remainder is fed pneumatically in an air stream through a pipe 18 back to the top of the reheating vessel, which is shown at B. The quantity which is discharged and the quantity which is circulated back to the vessel B depend upon the temperature of operation; for the temperatures given above about 1 ton of product is discharged at 19 for every 4 tons which are circulated through the reheating vessel B.

The reheating vessel B is similar in construction to the hydrolysing vessel A, and contains three perforated diaphragms 10, 11 and 12, which support three fluidised beds 4, 5 and 6, and through which three standpipes 27, 28 and 29 run. The material loses some heat in flowing to the top of the vessel B through the pipe 18 and enters the vessel at a little over 400° C. It is fluidised by hot gases produced below the plate 12 by the combustion of fuel gas and air respectively introduced through pipes 23 and 24 controlled by valves 25 and 26, the fluidising conditions being the same as in the vessel A. The refractory material is heated by these gases to between 600 and 900° C., say about 700° C., and it flows at this temperature into a discharge pipe 30 through which it is pneumatically conveyed to a cyclone 32. The conveying gases are discharged at 34 from the cyclone, and the refractory material flows from the cyclone into the pipe 13.

The higher the temperature to which the refractory material is reheated, the less is the amount which has to be recirculated to maintain the hydrolysis reaction. If the temperature is too high, the refractory material tends to soften, and stick in the pipes, so the maximum reheating temperature is determined by the softening or decomposition temperature of the refractory material. In any case the refractory material should be heated to at least 450° C., so it must be capable of withstanding at least this temperature. In general, the refractory material should be capable of withstanding higher temperatures, since the preferred temperatures are, as indicated above, substantially higher than 450° C.

The hot waste gases leave the reheating vessel through a pipe 33, and as their temperature is generally of the order of 650° C., they may be used for heating purposes in the remainder of the plant.

Instead of passing direct to the pipes 22 and 33, the gases leaving the vessels A and B may pass through cyclones arranged within the vessels, so that fine material which would otherwise be carried away by the gases is separated and returned by each cyclone to the upper bed in the vessel, the gases then passing from the cyclone to the pipe 22 or 33.

When the refractory material is in the form of small pieces or lumps and is not fluidised, hydrolysing and reheating vessels may again be arranged in a circuit, each vessel being constructed so that the material will move through it under gravity. However, pneumatic conveying is limited to pieces not much greater than about ¼" across. When larger pieces are used, mechanical conveyors of the chain and bucket type may be employed. The same method of introducing the reaction gases into the hydrolysing chamber at two points may advantageously be used, the gases which enter nearer the point of discharge containing more steam than the other gases.

I claim:

1. The process of hydrolysing ferric chloride to ferric oxide, comprising the steps of forming a plurality of superposed beds of a hot finely divided preformed refractory material in a reaction zone, passing said material downwardly from bed to bed in said reaction zone, introducing a gas mixture containing ferric chloride and steam above the lowermost of said beds, introducing gas richer in steam than said gas mixture below the lowermost of said beds, and passing said gases upwardly through said reaction zone in countercurrent to said material whereby hydrolysis of said ferric chloride takes place on the surfaces of the finely divided material in said beds.

2. The process of hydrolysing ferric chloride to ferric oxide, comprising the steps of heating ferric oxide in particle form, passing said heated particles into a reaction chamber and forming a plurality of superposed beds within said reaction chamber, said particles being passed downwardly from bed to bed, introducing a first gaseous mixture containing ferric chloride and steam above the lowermost of said beds, introducing a second gaseous mixture below the lowermost of said beds, said second gaseous mixture having a higher steam content than said first gaseous mixture, and passing said gaseous mixtures upwardly in said reaction chamber whereby hydrolysis of said ferric chloride takes place on the particles of ferric oxide in said beds.

3. A continuous process of hydrolysing ferric chloride to ferric oxide and recovering the ferric oxide, comprising the steps of continuously introducing hot, finely divided preformed refractory material into a reaction vessel adjacent the top thereof and continuously withdrawing said material from a point adjacent but above the bottom of said vessel, simultaneously introducing into said vessel two gaseous mixtures, one of which is relatively rich in vaporized ferric chloride and the other of which is free from ferric chloride and relatively rich in steam, said second gaseous mixture serving to hydrolyse the ferric chloride in said first gaseous mixture on the surfaces of the finely divided material in said vessel, and one of said gaseous mixtures being introduced into said vessel at a point above said point from which the material is withdrawn but below the top of the vessel and the other of said gaseous mixtures being introduced into said vessel at a point below that from which said material is withdrawn, this gaseous mixture serving to fluidize the material in said vessel, whereby the material that is withdrawn from the vessel carries with it the desired ferric oxide formed by the hydrolysing action.

4. A process as set forth in claim 3 in which the preformed refractory material is ferric oxide.

5. A process as set forth in claim 3 in which said one gaseous mixture comprises ferric chloride and hydrochloric acid gas and said second gaseous mixture comprises steam and hydrochloric acid gas.

6. A process as set forth in claim 3 in which the gaseous mixture introduced into the vessel at a point above that from which the material is withdrawn is the one which is relatively rich in ferric chloride.

References Cited in the file of this patent

UNITED STATES PATENTS

| | | |
|---|---|---|
| 1,916,853 | Westcott | July 4, 1933 |
| 1,917,789 | Bacon | July 11, 1933 |
| 1,967,235 | Ferkel | July 24, 1934 |
| 1,992,685 | Westcott | Feb. 26, 1935 |
| 2,036,664 | Westcott | Apr. 7, 1936 |
| 2,176,242 | Bowes | Oct. 17, 1939 |
| 2,291,206 | Bowes | July 28, 1942 |
| 2,436,870 | Murphree | Mar. 2, 1948 |
| 2,471,844 | Strelzoff | May 31, 1949 |
| 2,582,246 | Garbo | Jan. 15, 1952 |
| 2,621,118 | Cyr et al. | Dec. 9, 1952 |

OTHER REFERENCES

Kite: "Chem. and Met. Eng.," vol. 54 pages 112–115, 1947.